United States Patent Office 2,702,304
Patented Feb. 15, 1955

2,702,304

CATALYTIC PRODUCTION OF HYDROQUINONES

Walter Reppe, Ludwigshafen (Rhine), Germany, assignor to Badische Anilin- & Soda-Fabrik Aktiengesellschaft, Ludwigshafen am Rhine, Germany No Drawing. Application May 8, 1952,
Serial No. 286,801

Claims priority, application Germany May 31, 1951

8 Claims. (Cl. 260—621)

The present invention relates to the catalytic production of hydroquinones, and in particular to the production of hydroquinones by the carbonylation of acetylene or acetylene compounds in the presence of water or alcohols.

It is known that hydroquinone is formed by treating acetylene in the presence of water or alcohols with metal carbonyls or metal carbonyl hydrides, if desired in the presence of basic compounds (see Walter Reppe, "Neue Entwicklungen auf dem Gebiet der Chemie des Acetylens und Kohlenoxyds," Springer-Verlag, 1949).

I have found, and this constitutes the object of my invention, that this synthesis of hydroquinone according to the equation $$2CH\equiv CH + 3CO + H_2O \rightarrow C_6H_6O_2 + CO_2$$

may be carried out catalytically. In other words, it is an object of my invention to replace metal carbonyls or metal carbonyl hydrides by carbon monoxide itself as the CO-spender in the reaction.

My invention consists in using as catalysts in the reaction between acetylene, water or alcohols, and carbon monoxide complex salts of metal carbonyl hydrides. In using these complex salts, a principally new type of catalyst is introduced into this art. Apart from the fact that the novel catalysts make it possible to avoid the use of metal carbonyls in stoichiometric amounts, they have the advantage that they are not irreversibly converted into metal carbonyls and carried away with the reaction product.

The catalysts used in my invention contain preferably as kations in addition to the heavy metal, such as cadmium, zinc, copper or a metal of the iron group, basic nitrogen compounds, in particular ammonium or amines, which contain besides the amino group only carbon and hydrogen. To cite a few examples of such kations, I mention $[Fe(NH_3)_6]^{++}$, $[Fe(NH_3)_6]^{+++}$, $[Co(NH_3)_6]^{++}$, $[Ni(NH_3)_6]^{++}$, $[Co(NH_2CH_2CH_2NH_2)_3]^{++}$, $$[Cd(NH_3)_2]^{++}$$

or analogous kations, wherein the $NH_3$ is replaced partly or totally by other organic amino compounds, or wherein the metals described are replaced by other heavy metals capable of forming complex kations. The anions of my catalysts are derived from metal carbonyl hydrides which are in fact relatively strong acids. The preferred metal carbonyl hydride I use in my invention is cobalt carbonyl hydride $HCo(CO)_4$.

The production of the catalysts used in my invention may be performed according to conventional methods. The cobalt carbonyl hydride may be manufactured according to the so-called base reaction by introducing the metal carbonyl into an aqueous solution of an alkali or alkali earth metal hydroxide or an amino compound. There is formed the corresponding salt of the metal carbonyl hydride which may now be caused to react with a complex heavy metal salt as they are obtainable by adding an excess of ammonia to a solution of an ordinary heavy metal salt derived from a mineral or organic acid.

A specific method of preparing the catalysts consists in treating with carbon monoxide aqueous solutions or suspensions of salts, oxides, or hydroxides of metals capable of being converted into metal carbonyl hydrides in the presence of aqueous ammonia or amines at 50° to 250° C., preferably at 100° to 200° C., and at a pressure of at least 30 atmospheres, preferably 150 to 200 atmospheres. To the reaction product thus obtained I add a solution of a complex heavy metal salt which then by double conversion forms the complex metal salt of the metal carbonyl hydride. The amount of ammonia or amino compound should at least be sufficient to combine with the anion of the metal salt and to replace the hydrogen atoms of the metal carbonyl hydride. When the formation of the ammonium or amino salt of the metal carbonyl hydride is finished, I add the solution of the complex metal salt or, when the amount of ammonia or amine in the first solution is sufficient, the solution of a simple metal salt capable of forming a complex compound thereby performing the precipitation of the catalyst. In all these steps air should be excluded because the catalysts are easily decomposed by the action of oxygen.

The catalysts produced according to these methods are, as a rule, difficultly soluble or unsoluble in water. They may be separated from the reaction solution by physical methods, such as decanting, filtration, centrifugation and similar methods. They may be purified by washing, preferably with an aqueous solution of ammonia or an amine, and dried under reduced pressure. I recommend to carry out all these operations by excluding air because the salts are sensitive to oxidation.

It is also possible to produce the catalysts in situ which means that I charge the reaction vessel to be used in the carbonylation with the ingredients necessary for forming the catalyst and producing it within the reaction vessel.

The starting materials for my invention are acetylene, water or alcohols, and carbon monoxide. It is not essential whether I use water or alcohols or aqueous alcohols because in any case hydroquinone is the final product. I prefer to use alcohols because they have the advantage to react much quicker with the other starting materials than water. Among the alcohols I prefer to use aliphatic saturated monovalent alcohols containing not more than 8 carbon atoms, such as ethanol, isobutanol, ethylene glycol monomethyl or ethyl ether and the lower homologues of these compounds.

The reaction runs smoothly and successfully with the aid of my catalysts at temperatures exceeding 80° C., preferably between 80° and 150° C. To facilitate the reaction I work under increased pressure, preferably at pressures exceeding 5 atmospheres and, for safety reasons, at pressures between 5 and 30 atmospheres. I may use higher pressures, provided that the acetylene is strongly diluted by other gases, for example when working with a carbon monoxide-acetylene mixture containing a substantial excess of carbon monoxide. The partial pressure of acetylene under the reaction conditions should not be lower than 5 atmospheres.

I may carry out the reaction discontinuously in the conventional high pressure autoclaves, lined with suitable material. I may also carry out the reaction in a continuous manner according to the various methods known in the art. In both cases I may apply the catalysts in dissolved or suspended state or rigidly arranged.

In a continuous operation I may allow the reaction liquid to flow downwards through a vertical high pressure vessel which is charged with a catalyst or filler bodies or similar installations so that the liquid trickles over the catalyst or the filler bodies while the gas is led in direct or countercurrent to the liquid. I may also lead the liquid through such a vessel upwards together with the gas and provide the catalyst in a dissolved or solid state so that it is continuously led through the reaction zone together with the starting materials. The carbon monoxide and the acetylene may be used as circulating gas.

Suitable solvents for the process are preferably the liquid starting materials themselves, for example the alcohols. I may use also other solvents, such as hydrocarbons, but the use of the alcohols is preferred.

The following examples will further illustrate how my invention may be carried out.

Example 1

A shakable autoclave of 250 cubic centimeters content made from stainless steel is charged under an atmosphere of nitrogen with 60 grams of anhydrous ethanol and 19 grams of the complex salt of the formula $$[Fe(NH_3)_6][Co(CO)_4]_2$$

The autoclave is then put under a pressure of 20 atmospheres by charging a mixture of equal volumes of acetylene and carbon monoxide. The whole is then heated to 95° C. and the pressure maintained at 30 atmospheres by continuously charging the acetylene-carbon monoxide mixture until the latter is no longer absorbed. In the course of 70 hours a total of about 256 atmospheres of the gas mixture is taken up by the reaction liquid.

After allowing to cool down and releasing the pressure, the reaction product is distilled in vacuo. The alcohol not consumed is thus removed. Then the distillation residue is extracted with about 200 cubic centimeters of ether. The ether is distilled off and the residue fractionated in vacuo. After a small foreshot 17 grams of hydroquinone (M. P.=170°) are obtained. The residue left over from the ether extraction is boiled shortly with dilute aqueous sulfuric acid. Both the sulfuric acid and the solid residue are then extracted with ether. The ether extracts are combined, the ether removed and the residue distilled. Crude pyrocatechol (B. P.=130° to 140° C. under 0.4 millimeter) is obtained which may be purified by recrystallization from cyclohohexane.

The catalyst may be prepared in the following manner: A solution of 25 parts of cobalt chloride in 70 parts of water and 80 parts of concentrated aqueous ammonia is treated with carbon monoxide at 180° C. under 200 atmospheres. To the ammonium salt of cobalt carbonyl hydride thus obtained another 70 parts of concentrated aqueous ammonia are added together with a solution of 15 parts of Mohr's salt in 75 parts of water. The precipitate formed is filtered off and dried. It forms a crystalline green compound of the formula $$[Fe(NH_3)_6][Co(CO)_4]_2$$

A catalyst of similar activity is obtained by adding to the solution of the ammonium salt of cobalt carbonyl hydride, described in the preceding paragraph, a solution of 15 parts of Mohr's salt and 30 parts of ethylene diamine in 100 parts of water. The crystalline yellow compound thus obtained corresponds to the formula $$[Fe(NH_2.CH_2.CH_2NH_2)_3][Co(CO)_4]_2$$

Another catalyst which may be used instead of the two above described catalysts may be obtained by adding 15 parts of ferrous sulfate in 100 parts of water to the solution of the ammonium salt of cobalt carbonyl hydride as described above and a solution of 30 parts of hexamethylene diamine in 70 parts of water. The colorless compound thus obtained is sensitive to light and oxygen. It corresponds to the formula $$[Fe(NH_2.(CH_2)_6NH_2)_3][Co(CO)_4]_2$$

When adding to the solution of the ammonium salt of cobalt carbonyl hydride a solution of 30 parts of pyridine in 15 parts of water and a solution of 12 parts of Mohr's salt in 100 parts of water, a yellowish green pyridine iron complex salt of cobalt carbonyl hydride is obtained. This may be also used instead of the catalyst described above.

*Example 2*

In the manner described in Example 1 a mixture of 60 grams of ethanol, 25 grams of hydroquinone and 6 grams of the complex compound described in Example 1 are treated with carbon monoxide and acetylene at from 90° to 100° C. under a pressure of 25 atmospheres until the gas is no longer absorbed. A total of 80 atmospheres of the gas mixture is absorbed in the course of 41 hours. The reaction product is filtered off by suction, the solid residue washed with water, the joined filtrates are heated to remove the alcohol, and the solid residue thus obtained is extracted with ether. After removing the ether, 35 grams of hydroquinone (M. P.=171° C.) are obtained.

I claim:

1. In a process for the catalytic production of hydroquinone by the reaction of acetylene with carbon monoxide in the presence of an oxygen compound selected from the group consisting of water and alcohols at elevated temperature and under superatmospheric pressure, the improvement which comprises using as a catalyst a complex heavy metal salt of cobalt carbonyl hydride.

2. A process as set forth in claim 1, wherein the complex kation of the catalyst is derived from a heavy metal atom and a basic nitrogen compound.

3. A process as set forth in claim 1, wherein the complex kation of the catalyst is derived from a heavy metal atom and ammonia.

4. A process as set forth in claim 1, wherein the complex kation is derived from a metal of the iron group of the periodic system and ammonia.

5. A process as set forth in claim 1, wherein the complex kation is derived from a metal of the iron group of the periodic system and a primary amine.

6. A process for the catalytic production of hydroquinone which comprises pressing a mixture of acetylene and carbon monoxide under a pressure exceeding 5 atmospheres to an aliphatic saturated monovalent alcohol at temperatures between 80° and 150° C. in the presence of a complex iron salt of cobalt carbonyl hydride.

7. The process as set forth in claim 6, wherein a catalyst is used the kation of which contains a basic nitrogen radicle in complex combination with iron.

8. The process as set forth in claim 6, wherein the compound of the formula $[Fe(NH_3)_6][Co(CO)_4]_2$ is used as the catalyst.

References Cited in the file of this patent

Bigelow: Chemical and Engineering News, vol. 25 (April 14, 1947), pages, 1038–42 (5 pp.). Pages 1039 and 1041 only are pertinent.

Copenhaver et al.: "Acetylene and Carbon Monoxide Chemistry," pages 288, 290, 292, 293 (4 pp.). Pub. by Reinhold Pub. Corp., New York (1949).